US010196921B2

United States Patent
Gatzen et al.

(10) Patent No.: US 10,196,921 B2
(45) Date of Patent: Feb. 5, 2019

(54) MODULAR DOWNHOLE GENERATOR

(71) Applicants: Matthias Gatzen, Isernhagen (DE); Sebastian Tegeler, Hannover (DE); Steffen Toscher, Lueneburg (DE); Cord Simon Huber, Gehrden (DE); Arne Deiters, Celle (DE)

(72) Inventors: Matthias Gatzen, Isernhagen (DE); Sebastian Tegeler, Hannover (DE); Steffen Toscher, Lueneburg (DE); Cord Simon Huber, Gehrden (DE); Arne Deiters, Celle (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 18 days.

(21) Appl. No.: 15/187,168

(22) Filed: Jun. 20, 2016

(65) Prior Publication Data

US 2017/0362953 A1    Dec. 21, 2017

(51) Int. Cl.
*H02K 7/00*    (2006.01)
*F01D 15/10*    (2006.01)
(Continued)

(52) U.S. Cl.
CPC ............ *F01D 15/10* (2013.01); *E21B 7/00* (2013.01); *E21B 21/00* (2013.01);
(Continued)

(58) Field of Classification Search
CPC ......... E21B 7/00; E21B 21/00; E21B 41/0085
(Continued)

(56) References Cited

U.S. PATENT DOCUMENTS

| 1,960,484 A | * | 5/1934 | Ekstromer | ............. H02K 5/132 310/112 |
| 3,342,267 A | * | 9/1967 | Cotter | ..................... E21B 36/04 166/60 |

(Continued)

FOREIGN PATENT DOCUMENTS

| DE | 19706371 A1 | 8/1998 |
| WO | WO2004061269 A1 | 7/2004 |

(Continued)

OTHER PUBLICATIONS

Notification of Transmittal of the International Search Report and the Written Opinion of the International Searching Authority, or the Declaration; PCT/US2016/031854; dated Sep. 1, 2016; 13 pages.
(Continued)

*Primary Examiner* — Julio C. Gonzalez Ramirez
(74) *Attorney, Agent, or Firm* — Cantor Colburn LLP (57) ABSTRACT

An modular apparatus for generating electrical power in a borehole penetrating the earth includes a body comprising first and second mechanical connectors at opposing ends and first and second electrical connectors at the opposing ends, the mechanical connectors and the electrical connectors being configured to connect with the same type of corresponding connectors on another modular apparatus when the modular apparatus and the another modular apparatus are stacked together. The modular apparatus further includes: an electrical generator having a rotor and stator in mechanical communication with the first and second mechanical connectors and in electrical communication with the first and second electrical connectors; and a turbine wheel coupled to or integrated with the rotor and comprising one or more turbine blades that are configured to interact with fluid flowing through the borehole causing the turbine wheel to
(Continued)

rotate and the rotor to rotate in order to generate the electrical power.

20 Claims, 7 Drawing Sheets

(51) Int. Cl.
| | |
|---|---|
| H02K 7/18 | (2006.01) |
| H02K 1/27 | (2006.01) |
| H02K 11/04 | (2016.01) |
| F01D 5/02 | (2006.01) |
| F01D 5/12 | (2006.01) |
| F01D 9/04 | (2006.01) |
| E21B 41/00 | (2006.01) |
| E21B 7/00 | (2006.01) |
| E21B 21/00 | (2006.01) |

(52) U.S. Cl.
CPC .......... *E21B 41/0085* (2013.01); *F01D 5/02* (2013.01); *F01D 5/12* (2013.01); *F01D 9/041* (2013.01); *H02K 1/27* (2013.01); *H02K 7/1823* (2013.01); *H02K 11/046* (2013.01); *F05D 2220/76* (2013.01)

(58) Field of Classification Search
USPC ......... 290/43, 54, 1 R; 166/66.4, 66.5, 66.1; 175/57, 320, 107
See application file for complete search history.

(56) References Cited

U.S. PATENT DOCUMENTS

| | | | | |
|---|---|---|---|---|
| 4,578,608 | A * | 3/1986 | Mech | H02K 5/132 |
| | | | | 310/112 |
| 4,691,155 | A | 9/1987 | Taylor et al. | |
| 4,975,979 | A | 12/1990 | Baird | |
| 5,233,286 | A | 8/1993 | Rozman et al. | |
| 5,744,877 | A | 4/1998 | Owens | |
| 5,844,397 | A | 12/1998 | Konecny et al. | |
| 6,038,152 | A | 3/2000 | Baker | |
| 6,315,523 | B1 | 11/2001 | Mills | |
| 6,700,252 | B2 * | 3/2004 | Fleshman | H02K 5/132 |
| | | | | 310/254.1 |
| 6,848,503 | B2 * | 2/2005 | Schultz | E21B 41/0085 |
| | | | | 166/66.5 |
| 6,900,997 | B2 | 5/2005 | Perreault et al. | |
| 7,133,325 | B2 | 11/2006 | Kotsonis et al. | |
| 7,407,589 | B2 * | 8/2008 | Holland | C02F 1/485 |
| | | | | 166/66.5 |
| 7,504,752 | B2 * | 3/2009 | Head | E21B 43/128 |
| | | | | 166/66.4 |
| 7,762,354 | B2 * | 7/2010 | Garcia-Osuna | E21B 17/003 |
| | | | | 166/65.1 |
| 7,913,774 | B2 | 3/2011 | Partouche | |
| 8,353,336 | B2 | 1/2013 | Neuhaus et al. | |
| 8,378,644 | B2 | 2/2013 | Said et al. | |
| 2003/0178960 | A1 | 9/2003 | Kassing | |
| 2003/0213598 | A1 * | 11/2003 | Hughes | E21B 17/003 |
| | | | | 166/380 |
| 2004/0251048 | A1 | 12/2004 | Kurkoski | |
| 2005/0117453 | A1 | 6/2005 | Lehr | |
| 2006/0113803 | A1 * | 6/2006 | Hall | E21B 41/0085 |
| | | | | 290/54 |
| 2011/0170320 | A1 | 7/2011 | Coenen et al. | |
| 2012/0119711 | A1 | 5/2012 | Rozman et al. | |
| 2012/0168177 | A1 * | 7/2012 | Moeny | E21B 7/15 |
| | | | | 166/380 |
| 2013/0255933 | A1 | 10/2013 | Shen | |
| 2013/0314953 | A1 | 11/2013 | Cuzner et al. | |
| 2014/0104908 | A1 | 4/2014 | Mehringer et al. | |
| 2014/0354081 | A1 | 12/2014 | Li et al. | |
| 2015/0308235 | A1 * | 10/2015 | Moeny | E21B 7/15 |
| | | | | 166/244.1 |
| 2016/0102529 | A1 * | 4/2016 | DiSantis | E21B 41/0085 |
| | | | | 166/381 |
| 2016/0333670 | A1 | 11/2016 | Tegeler et al. | |

FOREIGN PATENT DOCUMENTS

| | | |
|---|---|---|
| WO | 2013191688 A1 | 12/2013 |
| WO | 2015017110 A1 | 2/2015 |

OTHER PUBLICATIONS

World Pumps; "Energy savings in submersible systems," Nov. 2011; www.worldpumps.com; 3 pages.

International Search Report and the Written Opinion of the International Searching Authority, or the Declaration; International Application No. PCT/US2017/038280; dated Sep. 15, 2017; 12 pages.

* cited by examiner

Disposing an electrical turbine generator assembly in a borehole, the electrical turbine generator assembly includes: (i) a first body configured to be disposed in the borehole, the first body having a first mechanical connector, a second mechanical connector, a first electrical connector, and a second electrical connector, wherein the first mechanical connector of the first body is configured to mechanically connect to the second mechanical connector of a second body having a second electrical generator, the second mechanical connector of the first body is configured to mechanically connect to the first mechanical connector of the second body, the first electrical connection is configured to electrically connect with the second electrical connector of the second body, and the second electrical connector of the first body is configured to electrically connect with the first electrical connector of the second body; (ii) a first electrical generator having a rotor and a stator disposed in the first body, the first electrical generator being in mechanical communication with the first mechanical connector at one end and the second mechanical connector at an opposing end, the first electrical generator being in electrical communication with the first electrical connector at one end and the second electrical connector at the opposing end; and (iii) a turbine wheel coupled to or integrated with the rotor and having one or more turbine blades that are configured to interact with fluid flowing through the borehole;

80

82

Flowing fluid through the borehole causing the turbine wheel to rotate and in turn causing the rotor to rotate in order to generate the electrical power

FIG.8

MODULAR DOWNHOLE GENERATOR

BACKGROUND

Boreholes are drilling into earth formations for various purposes such as hydrocarbon production, geothermal production and carbon dioxide sequestration. The boreholes are typically drilled using a drill tubular coupled to a drill bit. In order to make efficient use of the earth formations, they are characterized using downhole tools such as logging tools coupled to the drill tubular. The tools provide formation property measurements while the boreholes are being drilled in operations referred to as logging-while-drilling (LWD) or measurement-while-drilling (MWD).

The downhole tools generally require electrical power to operate. Unfortunately, providing electrical power from the surface while drilling is not practical. Thus, electrical generators disposed in a drill tubular may be used to convert the energy of mud flowing in a drill tubular to electrical power in order to power the downhole tools. Due to the confines of a bottomhole assembly (BHA) housing the tools, the amount of power generated by conventional downhole mud generators may be limited. Hence, it would be well received in the drilling industry if new downhole mud generators would be developed to generate more electrical power than conventional downhole mud generators or adapt to a required amount of electrical power.

BRIEF SUMMARY

Disclosed in an apparatus for generating electrical power in a borehole penetrating the earth. The apparatus includes: a first body configured to be disposed in the borehole, the first body having a first mechanical connector, a second mechanical connector, a first electrical connector, and a second electrical connector, wherein the first mechanical connector of the first body is configured to mechanically connect to the second mechanical connector of a second body having a second electrical generator, the second mechanical connector of the first body is configured to mechanically connect to the first mechanical connector of the second body, the first electrical connection is configured to electrically connect with the second electrical connector of the second body, and the second electrical connector of the first body is configured to electrically connect with the first electrical connector of the second body; a first electrical generator comprising a rotor and a stator disposed in the first body, the first electrical generator being in mechanical communication with the first mechanical connector at one end and the second mechanical connector at an opposing end, the first electrical generator being in electrical communication with the first electrical connector at one end and the second electrical connector at the opposing end; and a turbine wheel coupled to or integrated with the rotor and comprising one or more turbine blades that are configured to interact with fluid flowing through the borehole causing the turbine wheel to rotate and the rotor to rotate in order to generate the electrical power.

Also disclosed is a method for generating electrical power in a borehole penetrating the earth. The method includes disposing an electrical turbine generator assembly in the borehole. The electrical turbine generator assembly includes: a first body configured to be disposed in the borehole, the first body comprising a first mechanical connector, a second mechanical connector, a first electrical connector, and a second electrical connector, wherein the first mechanical connector of the first body is configured to mechanically connect to the second mechanical connector of a second body having a second electrical generator, the second mechanical connector of the first body is configured to mechanically connect to the first mechanical connector of the second body, the first electrical connection is configured to electrically connect with the second electrical connector of the second body, and the second electrical connector of the first body is configured to electrically connect with the first electrical connector of the second body; a first electrical generator having a rotor and a stator disposed in the first body, the first electrical generator being in mechanical communication with the first mechanical connector at one end and the second mechanical connector at an opposing end, the first electrical generator being in electrical communication with the first electrical connector at one end and the second electrical connector at the opposing end; and a turbine wheel coupled to or integrated with the rotor and comprising one or more turbine blades that are configured to interact with fluid flowing through the borehole. The method further includes flowing fluid through the borehole causing the turbine wheel to rotate and in turn causing the rotor to rotate in order to generate the electrical power.

BRIEF DESCRIPTION OF THE DRAWINGS

The following descriptions should not be considered limiting in any way. With reference to the accompanying drawings, like elements are numbered alike:

FIG. 8 is a flow chart for a method for generating electrical power in a borehole penetrating the earth.

DETAILED DESCRIPTION

A detailed description of one or more embodiments of the disclosed apparatus and method presented herein by way of exemplification and not limitation with reference to the figures.

Disclosed are embodiments of apparatuses and methods for generating electrical power in a drilling assembly disposed in a borehole penetrating the earth using a modular turbine generator, which may include an electrical alternator. A turbine wheel is connected to a rotor such that as the drilling fluid flows past turbine blades in the turbine wheel the turbine wheel rotates and, thus, turns the rotor to generate the electrical power. By coupling the turbine wheel directly to the rotor, the modular turbine generator does not require a magnetic clutch and can thus be made more compact than conventional mud generators. Each modular turbine generator is configured to be mechanically coupled in series to another modular turbine generator. Hence, due the compact nature of each modular turbine generator, multiple modular generators can be coupled together to provide a desired amount of electrical power. In general, the amount of generated power corresponds to the power requirements of downhole tools in the drilling assembly.

Figure 1:
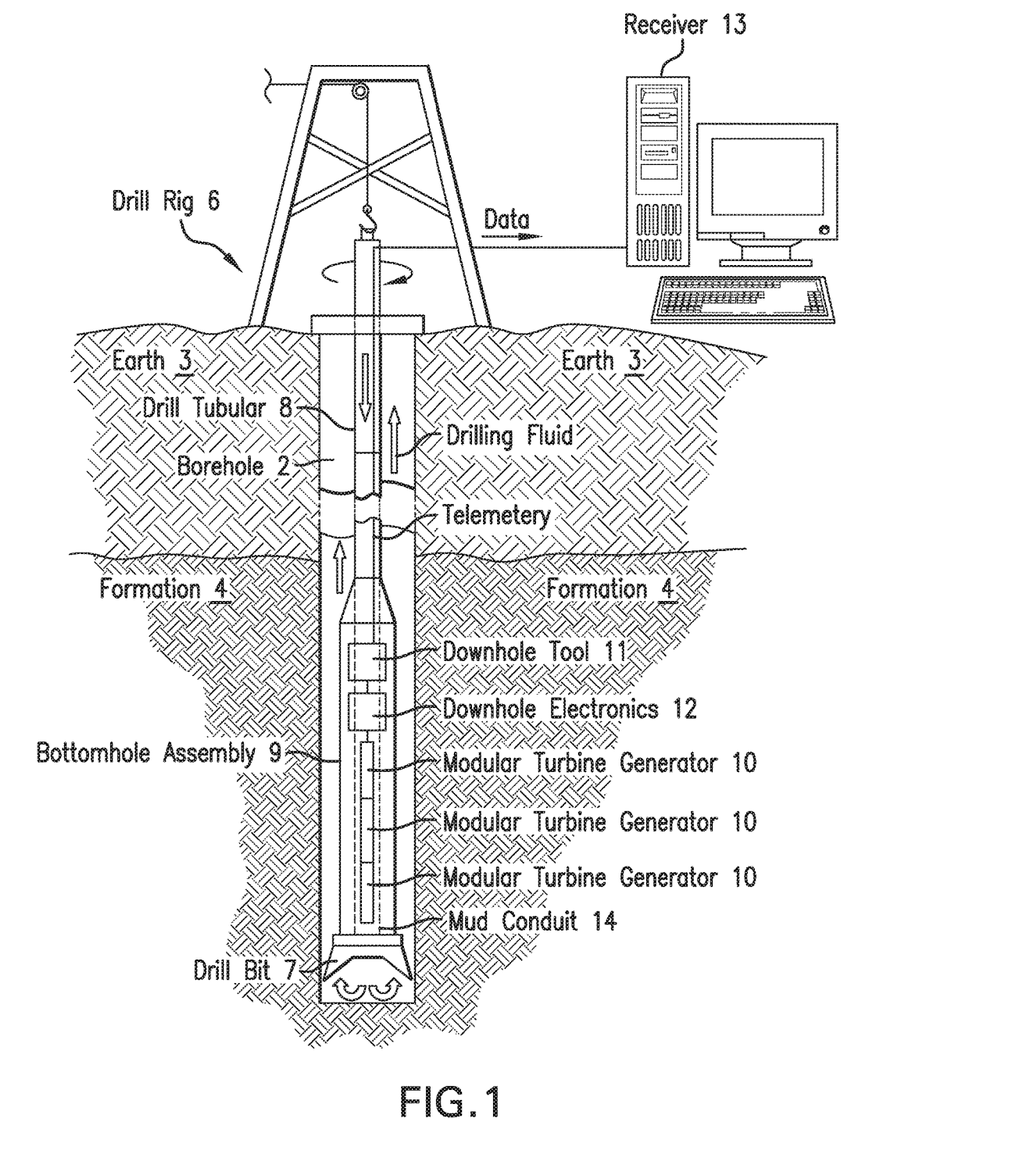
FIG. 1 is a cross-sectional view of a bottomhole assembly having a series of downhole modular turbine generators disposed in a borehole penetrating the earth.

FIG. 1 is a cross-sectional view of a bottomhole assembly (BHA) 9 disposed in a borehole 2 penetrating the earth 3 having a formation 4. The formation 4 represents any subsurface material of interest that is being drilled. The BHA 9 is disposed at the distal end of a drill tubular 8 such as a string of connected drill pipes referred to as a drill string. A drill bit 7 is coupled to the drill tubular 8 and is configured to cut or disintegrate rock to form the borehole 2. A drill rig 6 is configured to perform operations for drilling the borehole 2 such as rotating the drill tubular 8 and thus the drill bit 7 in order to drill the borehole 2. In addition, the drill rig 6 is configured to pump drilling fluid or mud through the drill tubular 8 in order to flush cuttings from the borehole 2 and lubricate the drill bit 7.

Disposed in the BHA 9 are one or more downhole tools 11. The downhole tools 11 are configured to perform selected functions downhole such as performing downhole measurements on the formation 4 or the borehole 2 as non-limiting examples. Measurement data may be transmitted to a receiver 13 at the surface using telemetry such as pulsed-mud or wired drill pipe. Commands may be transmitted to the one or more downhole tools 11 from a controller, such as the receiver 13, using the telemetry.

The one or more downhole tools 11 require electrical power to operate. Electrical power is supplied to the one more downhole tools 11 by one or more downhole modular turbine generators 10. In the embodiment of FIG. 1, three downhole modular turbine generators 10 are disposed in a series in a mud conduit 14 in the BHA 9. Drilling fluid flowing through the mud conduit 11 turns a turbine wheel in each downhole modular turbine generator 10 which in turn rotates a rotor in an electrical generator in the corresponding modular turbine generator 10 to generate electrical power. Downhole electronics 12 conditions the generated electrical power to enable its use by the one or more downhole tools 9. Non-limiting embodiments of electrical power conditioning include passive rectification, active rectification, and/or voltage transformation.

Figure 2:
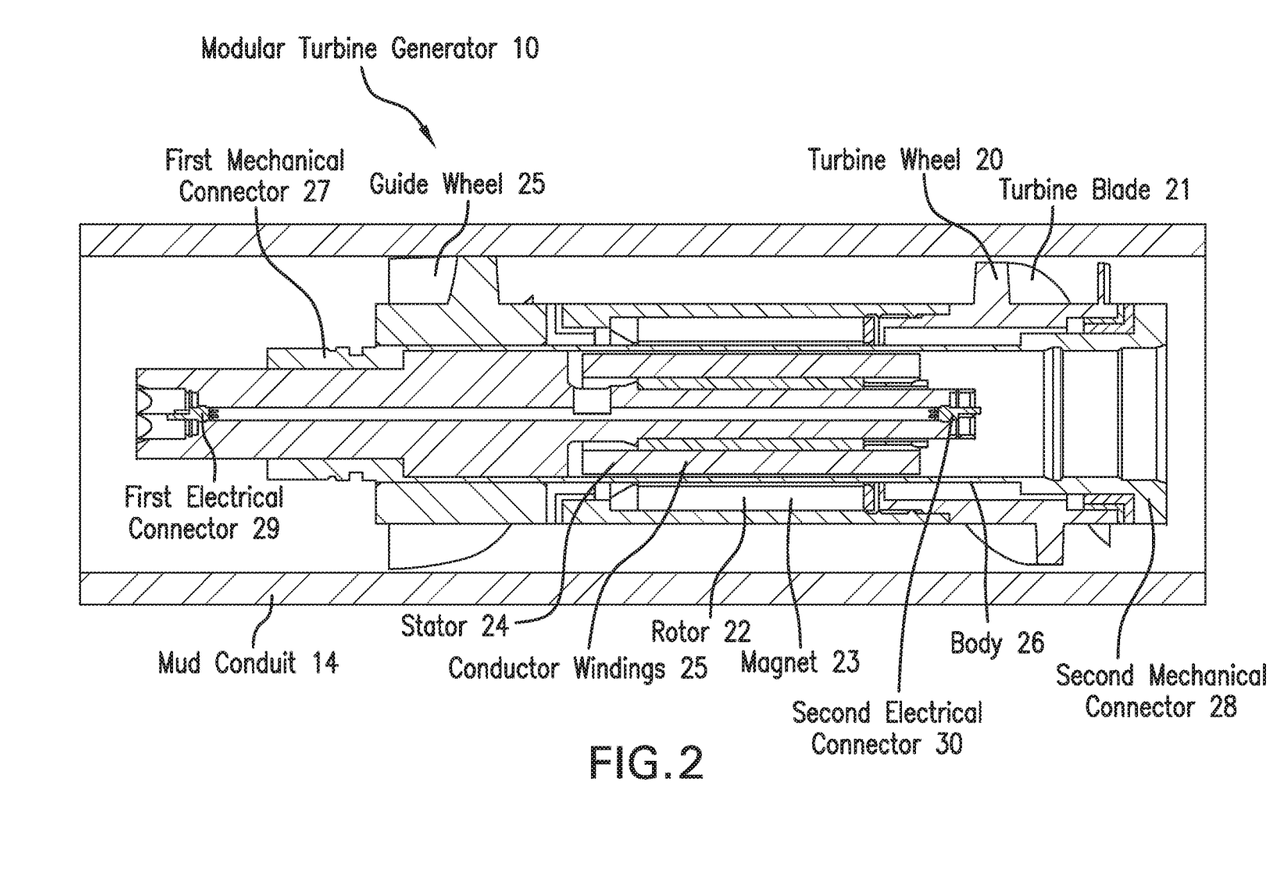
FIG. 2 depicts aspects of the downhole modular turbine generator.

FIG. 2 depicts aspects of the downhole modular turbine generator 10. The turbine generator 10 includes a turbine wheel 20 having one or more turbine blades 21, which are configured to interact with flowing drilling fluid to rotate the turbine wheel 20. An optional guide wheel 25 is fixed to a housing or body 26 of the turbine generator 10. The guide wheel 25 is configured to precondition the flow of the drilling fluid before it impinges the turbine wheel 20 in order for the flowing drilling fluid to impinge the turbine blades 21 at a selected angle to improve efficiency of energy conversion. It can be appreciated that the angle is selected based upon the design of the turbine blades 21.

The turbine wheel 20 is mechanically coupled to a rotor 22 or integrated with the rotor 22 (e.g., monolithic piece common to the turbine wheel and the rotor) such that the rotor 22 rotates when the turbine wheel 20 rotates. The rotor 22 includes a magnet 23, which can be a permanent magnet and/or an electromagnet. As the rotor 22 rotates, a magnet field generated by the magnet 23 rotates about a stator 24 having conductor windings 25. The rotating magnetic field generates a voltage in the windings 25 in order to provide electrical power.

Coupled to the housing 26 is a first mechanical connector 27 disposed at one end of the turbine generator 10 and a second mechanical connector 28 disposed at an opposing end of the turbine generator 10. The first mechanical connector 27 is configured to connect or interlock with the second mechanical connector 28 that would be on another turbine generator 10 so that two or more turbine generators 10 can be stacked in a series configuration. In one or more embodiments, an end mechanical connector in a stack of turbine generators may be mechanically connected to an electronics housing or other BHA part and an end electrical connector in the stack may be electrically connected to downhole electronics in the electronics housing or other BHA part.

Also coupled to the housing 26 is a first electrical connector 29 in the vicinity of the first mechanical connector 27 and a second electrical connector 30 in the vicinity of the second mechanical connector 28. The first and second electrical connectors 29 and 30 include electrical connections to the stator windings 25 for providing connections to the generated electrical power. The first electrical connector 29 is configured to mate with the second electrical connector 30 that would be on another turbine generator 10. The electrical connections in the electrical connectors 29 and 30 (to include the number of connections and their configuration) are dependent on the type of electrical connections desired such as parallel connections, series connections, pass-through connections, other connection types, and/or some combination thereof. Hence, series stacking of two or more turbine generators 10 may include both mechanical stacking connections and electrical stacking connections.

Figure 3:
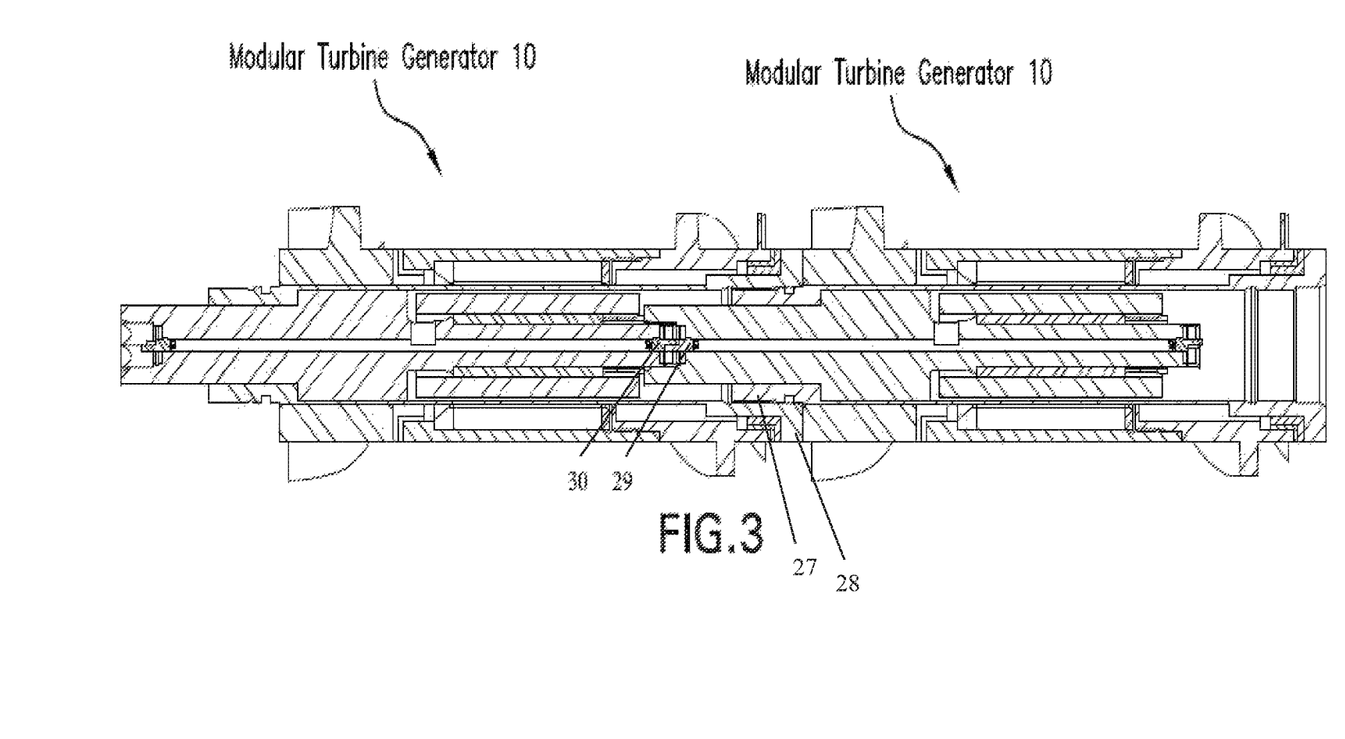
FIG. 3 depicts aspects of two downhole modular turbine generators mechanically coupled together in series.

FIG. 3 is a cross-sectional view of an embodiment of two turbine generators 10 mechanically and electrically coupled together.

Figure 4:
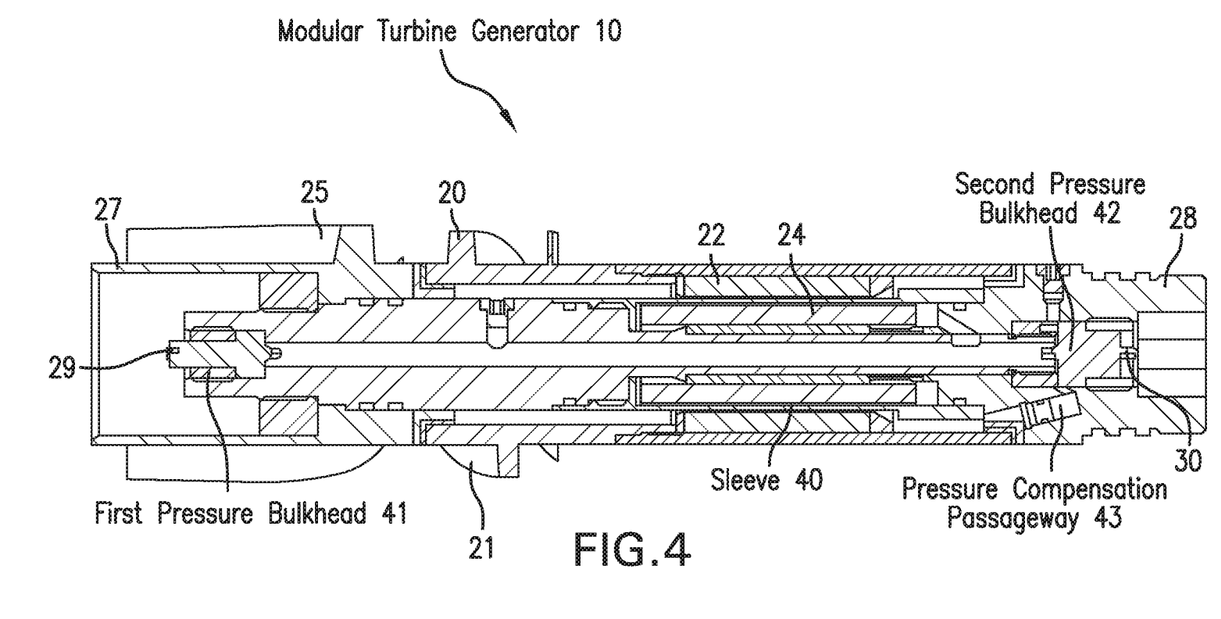
FIG. 4 depicts aspects of the downhole modular turbine generator in an oil-filled configuration.

FIG. 4 is a cross-sectional view of an embodiment of the downhole modular turbine generator 10 in a fluid-filled configuration in which the turbine generator 10 is hermetically sealed. In the embodiment of FIG. 4, the turbine generator 10 is filled with oil to provide pressure compensation that balances the outside pressure exerted against the outside of the turbine generator 10 with the internal pressure of the oil internal to the turbine generator 10. Pressure compensation enable housing components such as a sleeve 40, which separates the rotor from the stator, to be made thinner. A thinner sleeve 40 provides for an increase of magnetic flux penetrating the sleeve 40 and interacting with the stator windings, thus increasing the amount of electrical power that is generated. Further, thinner housing components can provide for making the turbine generator 10 narrower, thus providing less resistance to drilling fluid flow and enabling an increase in electrical power generation. Further, a thinner sleeve is also beneficial when the sleeve is made of conductive material because this will result in less eddy-currents and thus less energy losses (i.e., $I^2R$ losses) in the sleeve. Components related to pressure compensation include a pressure compensation passage way 43 that provides access of the oil to internal spaces, a first pressure bulkhead 41, and a second pressure bulkhead 42. The pressure bulkheads 41 and 42 provide for sealing the electrical connectors from the outside environment. In one or more embodiments, the filling of the fluid (e.g., oil) can be accomplished after the turbine generators are connected together in a stack. By filling the fluid in this manner, fewer bulkheads and other pressure compensating features associated with filling each turbine generator separately may be required. In the embodiment of FIG. 4, an internal portion of the guide wheel 25 is used as the first mechanical connector.

Figure 5:
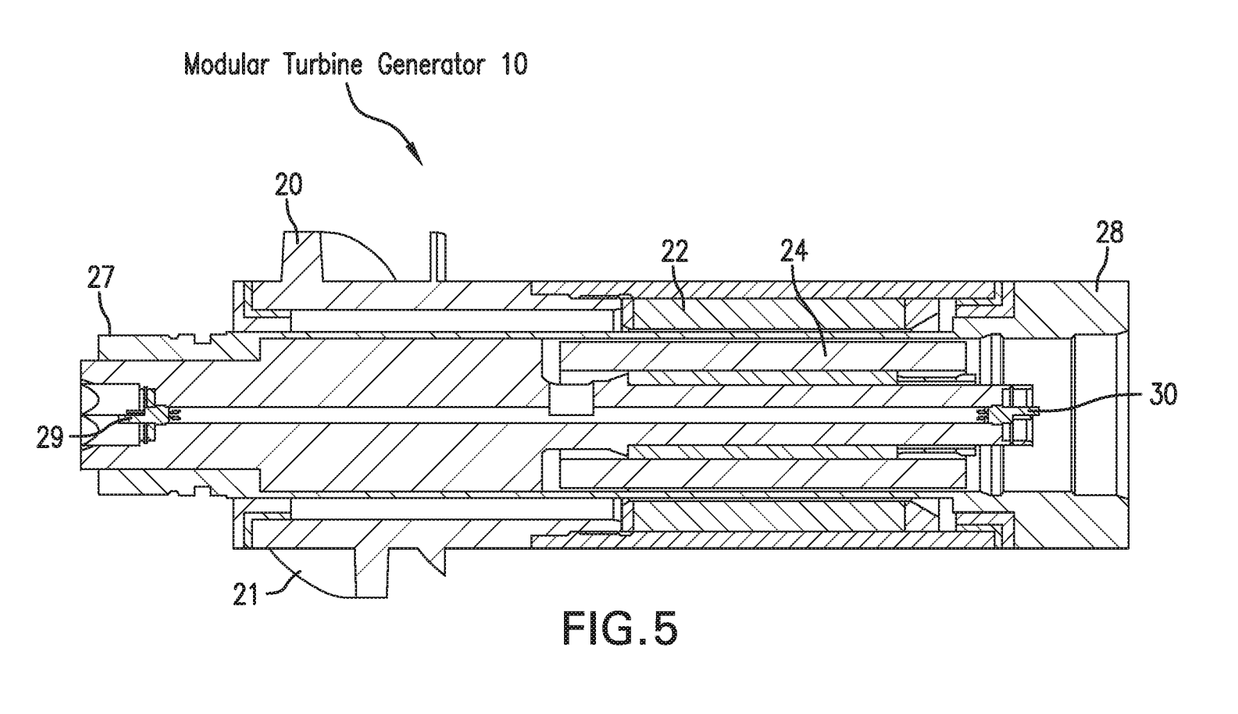
FIG. 5 depicts aspects of the downhole modular turbine generator without a guide wheel.

FIG. 5 depicts aspects of the downhole modular turbine generator without the guide wheel 25. In one or more embodiments, the lead or uppermost turbine generator 10 in a stack of turbine generators 10 may not have the guide wheel 25. In this case, the following turbine generator 10 may have a direction of rotation of the turbine wheel that is the opposite of the direction of rotation of the previous turbine wheel. For this embodiment, fluid flow coming off the first turbine wheel provides for adequate preconditioning before that same fluid flow impinges on the following turbine wheel rotating in the opposite direction. Similarly, for a stack of more than two turbine generators without guide wheels, the direction of rotation can alternate between one direction and the opposite direction for consecutive turbine generators in the stack where each preceding turbine wheel provides adequate preconditioning fluid flow for the following turbine wheel rotating in the opposite direction.

It can be appreciated that if the drilling fluid flow rate has a dynamic range that exceeds the corresponding rotational speed range of a single modular turbine generator 10, then a stack of modular turbine generators 10 may be used with each turbine generator 10 having a different turbine wheel configuration such that the entire dynamic fluid flow rate range or a desired portion of the dynamic fluid flow rate range can be accommodated. If one configuration of the turbine wheel can accommodate the dynamic fluid flow rate range, then a stack of the same modular turbine generators 10 may be used to increase the amount of electrical power being generated.

Figure 6:
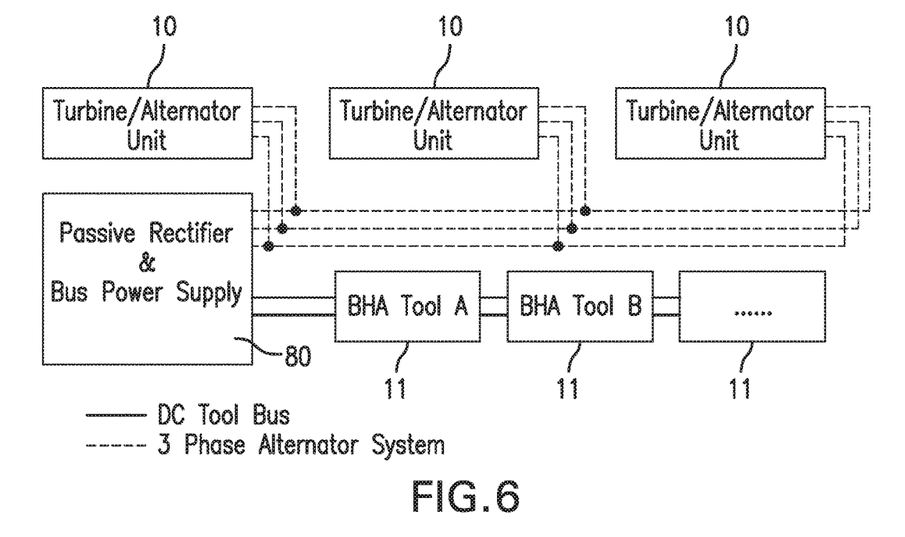
FIG. 6 depicts aspects of electrical connections between three downhole modular turbine generators with passive rectification.
Figure 7:
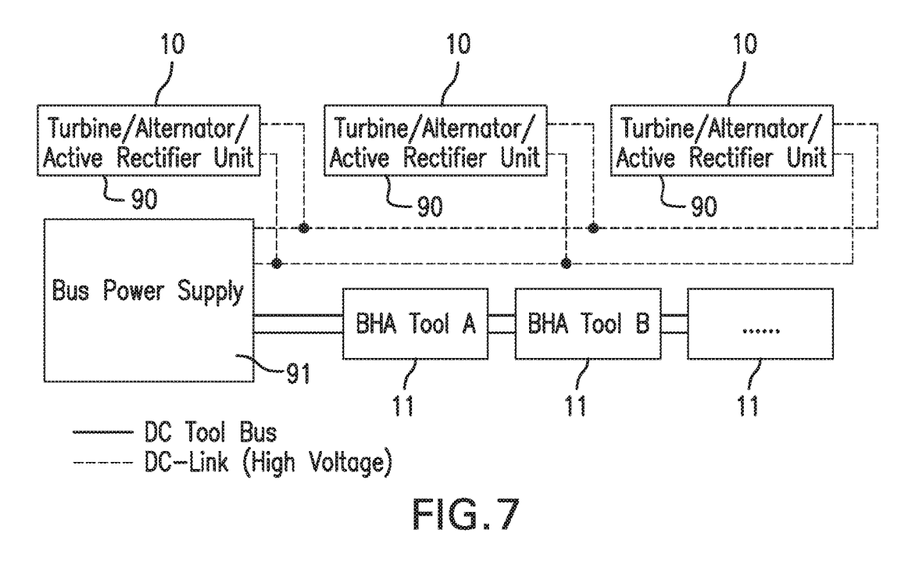
FIG. 7 depicts aspects of electrical connections between the three downhole modular turbine generators with active rectification.

As noted above, the downhole electronics 12 may be used to condition the generated electrical power to enable its use by the one or more downhole tools 9. FIG. 6 depicts aspects of electrical connections between three downhole modular turbine generators with passive rectification circuit and bus power supply 80 while FIG. 7 depicts aspects of electrical connections between the three downhole modular turbine generators with active rectification circuit 90 and bus power supply 91. In the embodiment of FIG. 6, each modular turbine generator 10 provides a three-phase electrical output that is in parallel with the three-phase outputs of the other turbine generators 10. The parallel three-phase electrical outputs are input into the downhole electronics 12, which includes the passive rectification circuit to supply direct current (DC) power to the one or more downhole tools 9 via the bus power supply. Passive rectification relates to using passive electrical components such as diodes to rectify the three-phase input power. In the embodiment of FIG. 7, each modular turbine generator 10 includes the downhole electronics 12, which provides the active rectification circuit at each turbine generator 10 to provide DC voltage via a DC-link to the bus power supply 91. The bus power supply 91 is configured to provide DC electrical power to the one or more downhole tools 11 at a desired voltage. Active rectification relates to using active electrical components such as transistors, thyristors or semiconductor switches to rectify the three-phase input power. Patent application Ser. No. 14/711,319 entitled "Active Rectifier For Downhole Applications," which is incorporated herein by reference in its entirety, discloses embodiments of active rectification in a downhole environment. One advantage of the active rectification scheme is that although each turbine generator 10 may have a different rotational speed due to energy being extracted from the flow of drilling fluid in a series of stages, the voltage output of each turbine generator 10 can be controlled to provide a desired DC voltage output to the DC-link.

It can be appreciated that the turbine generators 10 may be connected mechanically and electrically in various configurations. Firstly, the turbine wheels or rotors of each turbine generator 10 in a stack may or may not be mechanically connected such that each of the turbine wheels or rotors rotates at the same rotational speed. The advantage to mechanically coupling the turbine wheels or rotors is that alternating current (AC) output of each of the turbine generators 10 will be in synchronous with the other AC outputs. The advantage to not mechanically coupling the turbine wheels or rotors is that the mechanical complexity of the mechanical coupling or keying is avoided and each turbine generator can provide an electrical output that is independent of the other turbine generator electrical outputs. Secondly, the electrical outputs of each the turbine generators 10 in a stack may be connected in parallel or in series depending on a configuration that provides a desired electrical output that is accommodated by either passive or active rectification. Mechanical connection of the turbine wheels or rotors may be accomplished in one or more embodiments by a connecting element that is secured to all the turbine wheels or rotors such that the turbine wheels or rotors all rotate at the same rotational speed.

FIG. 8 is a flow chart for a method 80 for generating electrical power in a borehole penetrating the earth. Block 81 calls for disposing an electrical turbine generator assembly in the borehole. The electrical turbine generator assembly includes: (i) a first body configured to be disposed in the borehole, the first body having a first mechanical connector, a second mechanical connector, a first electrical connector, and a second electrical connector, wherein the first mechanical connector of the first body is configured to mechanically connect to the second mechanical connector of a second body having a second electrical generator, the second mechanical connector of the first body is configured to mechanically connect to the first mechanical connector of the second body, the first electrical connection is configured to electrically connect with the second electrical connector of the second body, and the second electrical connector of the first body is configured to electrically connect with the first electrical connector of the second body; (ii) a first electrical generator comprising a rotor and a stator disposed in the first body, the first electrical generator being in mechanical communication with the first mechanical connector at one end and the second mechanical connector at an opposing end, the first electrical generator being in electrical communication with the first electrical connector at one end and the second electrical connector at the opposing end; and (iii) a turbine wheel coupled to the rotor or integrated with the rotor and having one or more turbine blades that are configured to interact with fluid flowing through the borehole. Block 82 calls for flowing fluid through the borehole causing the turbine wheel to rotate that in turn causes the rotor to rotate in order to generate the electrical power.

The method 80 may also include coupling the first body to the second body using the second mechanical connector and the second electrical connector of the first body and the first mechanical connector and the first electrical connector of the second body.

The method 80 may also include rectifying outputs from the first electrical generator and the second electrical generator using a single passive rectifier circuit electrically connected to the first electrical generator and the second electrical generator. The method 80 may also include rectifying outputs from the first electrical generator and the second electrical generator using a first active rectifier circuit electrically connected to the first electrical generator and a second active rectifier circuit electrically coupled to the second electrical generator.

The method 80 may also include compensating for pressure external to the first body using an oil-filled passageway.

The method 80 may also include conditioning flow of the fluid using a guide wheel before the fluid impinges on the turbine wheel.

Embodiment 1

An apparatus for generating electrical power in a borehole penetrating the earth, the apparatus comprising: a first body configured to be disposed in the borehole, the first body comprising a first mechanical connector, a second mechanical connector, a first electrical connector, and a second electrical connector, wherein the first mechanical connector of the first body is configured to mechanically connect to the second mechanical connector of a second body having a second electrical generator, the second mechanical connector of the first body is configured to mechanically connect to the first mechanical connector of the second body, the first electrical connection is configured to electrically connect with the second electrical connector of the second body, and the second electrical connector of the first body is configured to electrically connect with the first electrical connector of the second body; a first electrical generator comprising a rotor and a stator disposed in the first body, the first electrical generator being in mechanical communication with the first mechanical connector at one end and the second mechanical connector at an opposing end, the first electrical generator being in electrical communication with the first electrical connector at one end and the second electrical connector at the opposing end; anda turbine wheel coupled to or integrated with the rotor and comprising one or more turbine blades that are configured to interact with fluid flowing through the borehole causing the turbine wheel to rotate and the rotor to rotate in order to generate the electrical power.

Embodiment 2

The apparatus according to any prior embodiment, wherein the first electrical generator is an electrical alternator wherein the rotor comprises a magnet and the stator comprises conductor windings.

Embodiment 3

The apparatus according to any prior embodiment, further comprising a guide wheel coupled to the first body, the guide wheel being configured to condition flow of the fluid to the turbine wheel.

Embodiment 4

The apparatus according to any prior embodiment, further comprising the second body having the second electrical generator coupled to the first body having the first electrical generator using the first mechanical connector and the first electrical connector of the first body and the second mechanical connector and the second electrical connector of the second body.

Embodiment 5

The apparatus according to any prior embodiment, wherein the second body comprises a turbine wheel coupled to the second electrical generator and the first body and the second body do not include a guide wheel configured to condition flow of the fluid to the corresponding turbine wheel.

Embodiment 6

The apparatus according to any prior embodiment, wherein the turbine wheel of the first body and the turbine wheel of the second body rotate in opposite directions.

Embodiment 7

The apparatus according to any prior embodiment, further comprising downhole electronics configured to rectify electrical output from the first electrical generator and the second electrical generator.

Embodiment 8

The apparatus according to any prior embodiment, wherein the downhole electronics comprise a single passive rectifier circuit electrically connected to the first electrical generator and the second electrical generator.

Embodiment 9

The apparatus according to any prior embodiment, wherein the downhole electronics comprise a first active rectifier circuit electrically connected to the first electrical generator and a second active rectifier circuit electrically coupled to the second electrical generator.

Embodiment 10

The apparatus according to any prior embodiment, wherein the first active rectifier circuit is disposed in the first body and the second active rectifier circuit is disposed in the second body.

Embodiment 11

The apparatus according to any prior embodiment, wherein the turbine wheels of the first body and the second body are mechanically coupled.

Embodiment 12

The apparatus according to any prior embodiment, wherein the turbine wheels of the first bod and the second body are not mechanically coupled.

Embodiment 13

The apparatus according to any prior embodiment wherein the first body comprises an fluid-filled passageway configured to compensate for pressure external to the first body.

Embodiment 14

The apparatus according to any prior embodiment, wherein the turbine wheel is directly coupled to the rotor such that one revolution of the turbine wheel causes one revolution of the rotor.

Embodiment 15

A method for generating electrical power in a borehole penetrating the earth, the method comprising: disposing an electrical turbine generator assembly in the borehole, the electrical turbine generator assembly comprising: a first body configured to be disposed in the borehole, the first body comprising a first mechanical connector, a second mechanical connector, a first electrical connector, and a second electrical connector, wherein the first mechanical connector of the first body is configured to mechanically connect to the second mechanical connector of a second body having a second electrical generator, the second mechanical connector of the first body is configured to mechanically connect to the first mechanical connector of the second body, the first electrical connection is configured to electrically connect with the second electrical connector of the second body, and the second electrical connector of the first body is configured to electrically connect with the first electrical connector of the second body; a first electrical generator comprising a rotor and a stator disposed in the first body, the first electrical generator being in mechanical communication with the first mechanical connector at one end and the second mechanical connector at an opposing end, the first electrical generator being in electrical communication with the first electrical connector at one end and the second electrical connector at the opposing end; and a turbine wheel coupled to or integrated with the rotor and comprising one or more turbine blades that are configured to interact with fluid flowing through the borehole; flowing fluid through the borehole causing the turbine wheel to rotate and in turn causing the rotor to rotate in order to generate the electrical power.

Embodiment 16

The method according to any prior embodiment, further comprising coupling the first body to the second body using the second mechanical connector and the second electrical connector of the first body and the first mechanical connector and the first electrical connector of the second body.

Embodiment 17

The method according to any prior embodiment, further comprising rectifying outputs from the first electrical generator and the second electrical generator using a single passive rectifier circuit electrically connected to the first electrical generator and the second electrical generator.

Embodiment 18

The method according to any prior embodiment, further comprising rectifying outputs from the first electrical generator and the second electrical generator using a first active rectifier circuit electrically connected to the first electrical generator and a second active rectifier circuit electrically coupled to the second electrical generator.

Embodiment 19

The method according to any prior embodiment, further comprising compensating for pressure external to the first body using an fluid-filled passageway.

Embodiment 20

The method according to any prior embodiment, further comprising conditioning flow of the fluid using a guide wheel before the fluid impinges on the turbine wheel.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first" and "second" are used to distinguish elements and are not used to denote a particular order.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for generating electrical power in a borehole penetrating the earth, the apparatus comprising:
a first body configured to be disposed in the borehole, the first body comprising a first mechanical connector, a second mechanical connector, a first electrical connector, and a second electrical connector, wherein the first mechanical connector of the first body is configured to mechanically connect to the second mechanical connector of a second body having a second electrical generator, the second mechanical connector of the first body is configured to mechanically connect to the first mechanical connector of the second body, the first electrical connector is configured to electrically connect with the second electrical connector of the second body, and the second electrical connector of the first body is configured to electrically connect with the first electrical connector of the second body;

a first electrical generator comprising a rotor and a stator disposed in the first body, the first electrical generator being in mechanical communication with the first mechanical connector at one end and the second mechanical connector at an opposing end, the first electrical generator being in electrical communication with the first electrical connector at one end and the second electrical connector at the opposing end; and a turbine wheel coupled to or integrated with the rotor and comprising one or more turbine blades that are configured to interact with fluid flowing through the borehole causing the turbine wheel to rotate and the rotor to rotate in order to generate the electrical power, wherein the rotor is a single rotor and the only rotor to which the turbine wheel is coupled to or integrated with.

2. The apparatus according to claim 1, wherein the first electrical generator is an electrical alternator wherein the rotor comprises a magnet and the stator comprises conductor windings.

3. The apparatus according to claim 1, further comprising a guide wheel coupled to the first body, the guide wheel being configured to condition flow of the fluid to the turbine wheel.

4. The apparatus according to claim 1, further comprising the second body having the second electrical generator coupled to the first body having the first electrical generator using the first mechanical connector and the first electrical connector of the first body and the second mechanical connector and the second electrical connector of the second body.

5. The apparatus according to claim 4, wherein the second body comprises a turbine wheel coupled to the second electrical generator and the first body and the second body do not include a guide wheel configured to condition flow of the fluid to the corresponding turbine wheel.

6. The apparatus according to claim 4, further comprising downhole electronics configured to rectify electrical output from the first electrical generator and the second electrical generator.

7. The apparatus according to claim 6, wherein the downhole electronics comprise a first active rectifier circuit electrically connected to the first electrical generator and a second active rectifier circuit electrically coupled to the second electrical generator.

8. The apparatus according to claim 7, wherein the first active rectifier circuit is disposed in the first body and the second active rectifier circuit is disposed in the second body.

9. The apparatus according to claim 4, wherein the turbine wheels of the first body and the second body are mechanically coupled.

10. The apparatus according to claim 4, wherein the turbine wheels of the first body and the second body are not mechanically coupled.

11. The apparatus according to claim 1, wherein the first body comprises a fluid-filled passageway configured to compensate for pressure external to the first body.

12. The apparatus according to claim 1, wherein the turbine wheel is directly coupled to the rotor such that one revolution of the turbine wheel causes one revolution of the rotor.

13. A method for generating electrical power in a borehole penetrating the earth, the method comprising:

disposing an electrical turbine generator assembly in the borehole, the electrical turbine generator assembly comprising:

a first body configured to be disposed in the borehole, the first body comprising a first mechanical connector, a second mechanical connector, a first electrical connector, and a second electrical connector, wherein the first mechanical connector of the first body is configured to mechanically connect to the second mechanical connector of a second body having a second electrical generator, the second mechanical connector of the first body is configured to mechanically connect to the first mechanical connector of the second body, the first electrical connector is configured to electrically connect with the second electrical connector of the second body, and the second electrical connector of the first body is configured to electrically connect with the first electrical connector of the second body;

a first electrical generator comprising a rotor and a stator disposed in the first body, the first electrical generator being in mechanical communication with the first mechanical connector at one end and the second mechanical connector at an opposing end, the first electrical generator being in electrical communication with the first electrical connector at one end and the second electrical connector at the opposing end; and a turbine wheel coupled to or integrated with the rotor and comprising one or more turbine blades that are configured to interact with fluid flowing through the borehole, wherein the rotor is a single rotor and the only rotor to which the turbine wheel is coupled to or integrated with;

flowing fluid through the borehole causing the turbine wheel to rotate and in turn causing the rotor to rotate in order to generate the electrical power.

14. The method according to claim 13, further comprising coupling the first body to the second body using the second mechanical connector and the second electrical connector of the first body and the first mechanical connector and the first electrical connector of the second body.

15. The method according to claim 14, further comprising rectifying outputs from the first electrical generator and the second electrical generator using a first active rectifier circuit electrically connected to the first electrical generator and a second active rectifier circuit electrically coupled to the second electrical generator.

16. The method according to claim 13, further comprising compensating for pressure external to the first body using a fluid-filled passageway.

17. The method according to claim 13, further comprising conditioning flow of the fluid using a guide wheel before the fluid impinges on the turbine wheel.

18. An apparatus for generating electrical power in a borehole penetrating the earth, the apparatus comprising:

a first body configured to be disposed in the borehole, the first body comprising a first mechanical connector, a second mechanical connector, a first electrical connector, and a second electrical connector, wherein the first mechanical connector of the first body is configured to mechanically connect to the second mechanical connector of a second body having a second electrical generator, the second mechanical connector of the first body is configured to mechanically connect to the first mechanical connector of the second body, the first electrical connector is configured to electrically connect with the second electrical connector of the second body, and the second electrical connector of the first body is configured to electrically connect with the first electrical connector of the second body;

a first electrical generator comprising a rotor and a stator disposed in the first body, the first electrical generator being in mechanical communication with the first mechanical connector at one end and the second mechanical connector at an opposing end, the first electrical generator being in electrical communication with the first electrical connector at one end and the second electrical connector at the opposing end; and a turbine wheel coupled to or integrated with the rotor and comprising one or more turbine blades that are configured to interact with fluid flowing through the borehole causing the turbine wheel to rotate and the rotor to rotate in order to generate the electrical power;

the second body having the second electrical generator coupled to the first body having the first electrical generator using the first mechanical connector and the first electrical connector of the first body and the second mechanical connector and the second electrical connector of the second body;

wherein the second body comprises a turbine wheel coupled to the second electrical generator and the first body and the second body do not include a guide wheel configured to condition flow of the fluid to the corresponding turbine wheel; and wherein the turbine wheel of the first body and the turbine wheel of the second body rotate in opposite directions.

19. An apparatus for generating electrical power in a borehole penetrating the earth, the apparatus comprising:

a first body configured to be disposed in the borehole, the first body comprising a first mechanical connector, a second mechanical connector, a first electrical connector, and a second electrical connector, wherein the first mechanical connector of the first body is configured to mechanically connect to the second mechanical connector of a second body having a second electrical generator, the second mechanical connector of the first body is configured to mechanically connect to the first mechanical connector of the second body, the first electrical connector is configured to electrically connect with the second electrical connector of the second body, and the second electrical connector of the first body is configured to electrically connect with the first electrical connector of the second body;

a first electrical generator comprising a rotor and a stator disposed in the first body, the first electrical generator being in mechanical communication with the first mechanical connector at one end and the second mechanical connector at an opposing end, the first electrical generator being in electrical communication with the first electrical connector at one end and the second electrical connector at the opposing end; and a turbine wheel coupled to or integrated with the rotor and comprising one or more turbine blades that are configured to interact with fluid flowing through the borehole causing the turbine wheel to rotate and the rotor to rotate in order to generate the electrical power;

the second body having the second electrical generator coupled to the first body having the first electrical generator using the first mechanical connector and the first electrical connector of the first body and the second mechanical connector and the second electrical connector of the second body;

downhole electronics configured to rectify electrical output from the first electrical generator and the second electrical generator;

wherein the downhole electronics comprise a single passive rectifier circuit electrically connected to the first electrical generator and the second electrical generator.

20. A method for generating electrical power in a borehole penetrating the earth, the method comprising:

disposing an electrical turbine generator assembly in the borehole, the electrical turbine generator assembly comprising:

a first body configured to be disposed in the borehole, the first body comprising a first mechanical connector, a second mechanical connector, a first electrical connector, and a second electrical connector, wherein the first mechanical connector of the first body is configured to mechanically connect to the second mechanical connector of a second body having a second electrical generator, the second mechanical connector of the first body is configured to mechanically connect to the first mechanical connector of the second body, the first electrical connector is configured to electrically connect with the second electrical connector of the second body, and the second electrical connector of the first body is configured to electrically connect with the first electrical connector of the second body;

a first electrical generator comprising a rotor and a stator disposed in the first body, the first electrical generator being in mechanical communication with the first mechanical connector at one end and the second mechanical connector at an opposing end, the first electrical generator being in electrical communication with the first electrical connector at one end and the second electrical connector at the opposing end; and a turbine wheel coupled to or integrated with the rotor and comprising one or more turbine blades that are configured to interact with fluid flowing through the borehole;

coupling the first body to the second body using the second mechanical connector and the second electrical connector of the first body and the first mechanical connector and the first electrical connector of the second body;

flowing fluid through the borehole causing the turbine wheel to rotate and in turn causing the rotor to rotate in order to generate the electrical power;

rectifying outputs from the first electrical generator and the second electrical generator using a single passive rectifier circuit electrically connected to the first electrical generator and the second electrical generator.

* * * * *